US006612288B2

(12) United States Patent
Cullen

(10) Patent No.: US 6,612,288 B2
(45) Date of Patent: Sep. 2, 2003

(54) DIAGNOSTIC METHOD FOR VARIABLE COMPRESSION RATIO ENGINE

(75) Inventor: Michael John Cullen, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 78 days.

(21) Appl. No.: 09/993,141

(22) Filed: Nov. 6, 2001

(65) Prior Publication Data

US 2003/0084875 A1 May 8, 2003

(51) Int. Cl.[7] .................................................. F02P 5/00
(52) U.S. Cl. ............................... 123/406.23; 123/406.29
(58) Field of Search ....................... 123/406.23, 406.29, 123/406.26; 701/110, 111

(56) References Cited

U.S. PATENT DOCUMENTS

| 4,246,873 A | | 1/1981 | Lih-Liaw |
|---|---|---|---|
| 4,286,552 A | | 9/1981 | Tsutsumi |
| 4,469,055 A | | 9/1984 | Caswell |
| 4,505,152 A | | 3/1985 | Haddox |
| 4,805,571 A | | 2/1989 | Humphrey |
| 4,834,031 A | | 5/1989 | Katoh et al. |
| 4,860,711 A | | 8/1989 | Morikawa |
| 5,001,645 A | * | 3/1991 | Williams et al. ............ 701/111 |
| 5,146,879 A | | 9/1992 | Kume et al. |
| 5,157,613 A | * | 10/1992 | Williams et al. ............ 701/111 |
| 5,165,368 A | | 11/1992 | Schechter |
| 5,255,637 A | | 10/1993 | Schechter |
| 5,287,827 A | | 2/1994 | Almendinger et al. |
| 5,417,185 A | | 5/1995 | Beattie |
| 5,562,068 A | | 10/1996 | Sugimoto et al. |
| 5,595,146 A | | 1/1997 | Bollig et al. |
| 5,682,854 A | | 11/1997 | Ozawa |
| 5,724,863 A | | 3/1998 | Kramer et al. |
| 5,738,074 A | * | 4/1998 | Nakamura et al. .......... 123/305 |
| 5,778,857 A | * | 7/1998 | Nakamura et al. ...... 123/406.37 |
| 5,791,302 A | | 8/1998 | Ma |
| 5,819,702 A | | 10/1998 | Mendler |
| 5,845,613 A | | 12/1998 | Yoshikawa |
| 5,862,790 A | | 1/1999 | Dai et al. |
| 5,865,092 A | | 2/1999 | Woudwyk |
| 5,960,750 A | | 10/1999 | Kreuter |
| 6,115,664 A | | 9/2000 | Cullen et al. |
| 6,125,801 A | | 10/2000 | Mendler |
| 6,135,086 A | | 10/2000 | Clarke et al. |
| 6,267,097 B1 | * | 7/2001 | Urushihara et al. ......... 123/305 |
| 6,443,125 B1 | * | 9/2002 | Mendler ..................... 123/316 |

FOREIGN PATENT DOCUMENTS

| DE | 19845965 A | 4/2002 |
|---|---|---|
| JP | 3-92552 | 4/1991 |

* cited by examiner

Primary Examiner—John Kwon
(74) Attorney, Agent, or Firm—Carlos L. Hanze

(57) ABSTRACT

A diagnostic method for a motor vehicle having an internal combustion engine operable in a plurality of compression ratio operating states includes the steps of determining a change in spark adjustment required to avoid knock as the engine is operated in selected ones of the compression ratio operating states, and evaluating operation of the internal combustion engine based at least in part on the change in spark adjustment.

22 Claims, 12 Drawing Sheets

DIAGNOSTIC METHOD FOR VARIABLE COMPRESSION RATIO ENGINE

BACKGROUND OF THE INVENTION

1. Field of the Invention

The present invention relates generally to variable compression ratio internal combustion engines. More particularly, the invention relates to a method and system for diagnosing operation of a compression ratio setting apparatus of a variable compression ratio internal combustion engine.

2. Background Art

The "compression ratio" of an internal combustion engine is defined as the ratio of the cylinder volume when the piston is at bottom-dead-center (BDC) to the cylinder volume when the piston is at top-dead-center (TDC). Generally, the higher the compression ratio, the higher the thermal efficiency and fuel economy of the internal combustion engine. So-called "variable compression ratio" internal combustion engines have been developed, for example, having higher compression ratios during low load conditions and lower compression ratios during high load conditions. Various techniques have been disclosed for varying compression ratio, including for example, using "sub-chambers and "sub-pistons" to vary the volume of a cylinder, see for example patents U.S. Pat. No. 4,246,873 and U.S. Pat. No. 4,286,552; varying the actual dimensions of all or a portion of a piston attached to a fixed length connecting rod, see U.S. Pat. No. 5,865,092; varying the actual length of the connecting rod itself, see U.S. Pat. Nos. 5,724,863 and 5,146,879; and using eccentric rings or bushings either at the lower "large" end of a connecting rod or the upper "small" end of the connecting rod for varying the length of the connecting rod or height of the reciprocating piston., see U.S. Pat. Nos. 5,562,068, U.S. Pat. No. 5,960,750, U.S. Pat. No. 5,417,185 and Japanese Publication JP-03092552.

When controlling the operation of a variable compression ratio engine, it is essential to accurately and reliably determine whether a compression ratio setting device for varying an engine's compression ratio is functioning as required. This is especially important, for example, when controlling ignition timing in the engine. In order to maximize fuel economy while minimizing engine knock, especially in high load conditions, it may be desirable to vary the engine's ignition timing based on a detected compression ratio of the engine. See for example U.S. Pat. No. 4,834,031. In such case, a dedicated sensor, such as combustion pressure sensor or piston position sensor, is used to determine the compression ratio operating mode of the variable compression ratio internal combustion engine.

As such, the inventor herein has recognized the need for a method of diagnosing operation of a variable compression ratio device that does not rely on dedicated sensors within the internal combustion engine.

SUMMARY OF THE INVENTION

A method is provided for diagnosing operation of an internal combustion engine having a plurality of compression ratio operating states. The method includes the steps of determining a change in spark adjustment required to avoid knock as the engine is operated in selected ones of the compression ratio operating states, and evaluating operation of the internal combustion engine based at least in part on the change in spark adjustment. Preferably, a first spark adjustment value is determined while the engine is operated in a first of the compression ratio operating states, and a second spark adjustment value determined at a second of the compression ratio operating states. A difference between the first and second spark adjustment values is determined and an indication of engine operation provided based on a comparison of the difference to a predetermined limit. The indication can be for example a status flag set in computer memory, and/or an audible or visible indication. The disclosed method can be used with a variable compression ratio engine having discrete compression ratio operating modes, for example a "high" and a "low" compression ratio, or with a continuously variable compression ratio engine having a plurality of intermediate compression ratio operating modes.

Advantageously, the operation of a variable compression engine in one or more compression ratio operating states can be accurately and reliably determined without relying on one or more dedicated sensors, such as pressure sensors or proximity or position sensors. The methods described herein, which can be implemented solely in computer code, can be used for diagnostic purposes to evaluate operation of a compression ratio setting apparatus, such as a retractable connecting rod or piston head or combustion sub-chamber. The disclosed invention therefore reduces costs and complexity associated with the manufacture, assembly, operation and maintenance of a variable compression ratio internal combustion engine.

In accordance with a related aspect of the present invention, a corresponding system is provided for operating a variable compression ratio internal combustion engine. The system includes at least one sensor disposed within the engine for generating a signal representative of engine knock, a compression ratio setting apparatus for configuring the engine in selected ones of the compression ratio operating states, and a controller in communication with the sensor and the compression ratio apparatus having computer program code for determining a change in spark adjustment required to avoid engine knock as the engine is commanded by the controller to operate the engine in selected ones of the compression ratio operating states, and for evaluating operation of the internal combustion engine based at least in part on the change in the spark adjustment. A notification device in communication with the controller provides information relating to the operation of the compression ratio setting apparatus to a vehicle operator.

Further advantages, objects and features of the invention will become apparent from the following detailed description of the invention taken in conjunction with the accompanying figures showing illustrative embodiments of the invention.

BRIEF DESCRIPTION OF THE DRAWINGS

For a complete understanding of the present invention and the advantages thereof, reference is now made to the following description taken in conjunction with the accompanying drawings in which like reference numerals indicate like features and wherein.

DETAILED DESCRIPTION OF THE PREFERRED EMBODIMENTS

Figure 1:
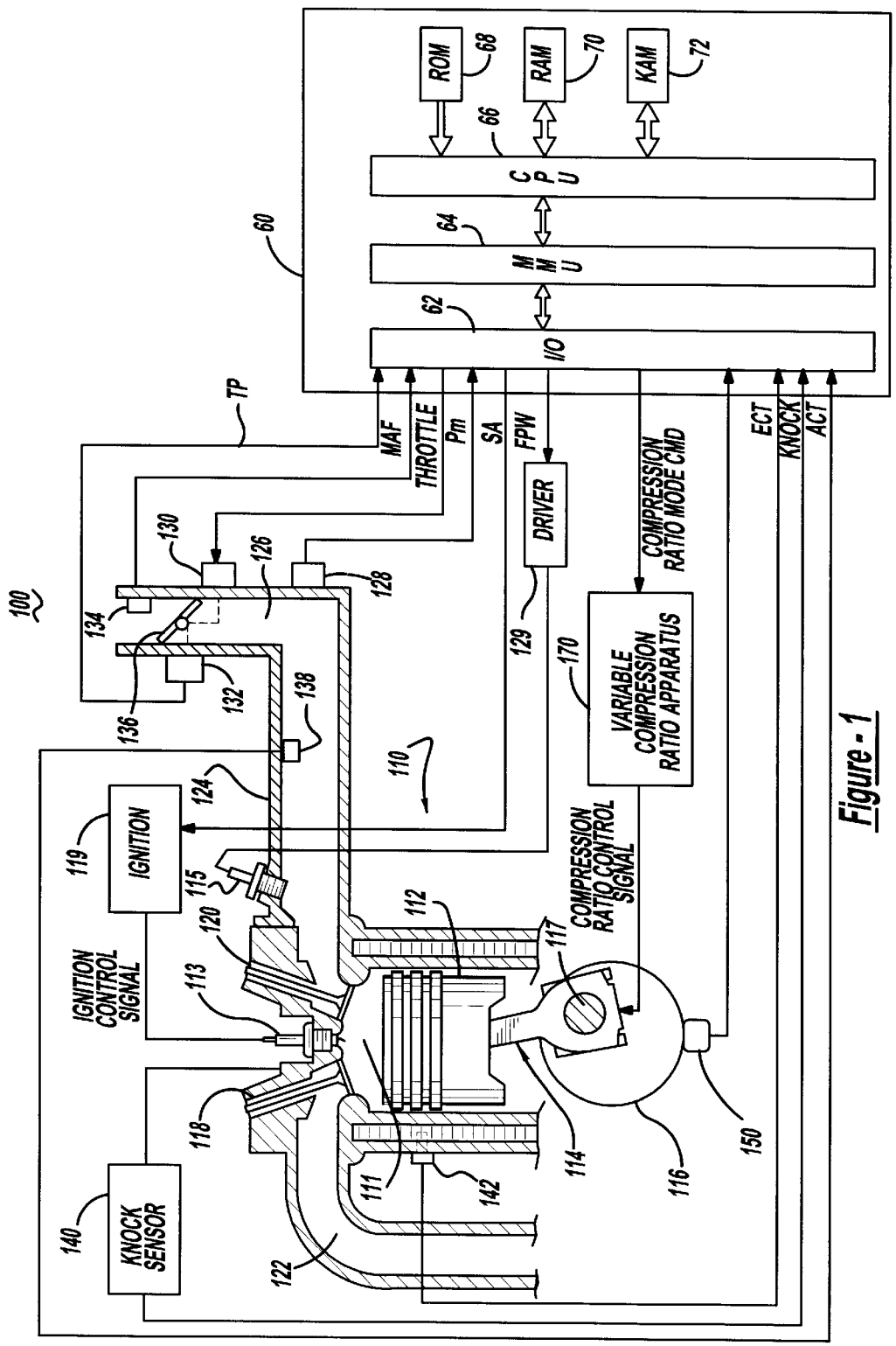
FIG. 1 is a diagram of an exemplary variable compression ratio internal combustion engine.

FIG. 1 shows an exemplary variable compression ratio internal combustion engine in accordance with the present invention. As will be appreciated by those of ordinary skill in the art, the present invention is independent of the particular underlying engine configuration and component designs, and as such can be used with a variety of different internal combustion engines having more than one compression ratio operating modes. The engine for example can be constructed and operated as a discrete compression ratio engine operating for example at a high compression or at low compression, or as a continuously variable compression ratio engine capable of operating at a any number of discrete compression ratios. Similarly, the present invention is not limited to any particular type of apparatus or method required for setting or varying the compression ratio of the internal combustion engine.

Referring again to FIG. 1, the engine 110 includes a plurality of cylinders (only one shown), each having a combustion chamber 111, a reciprocating piston 112, and intake and exhaust valves 120 and 118 for communicating the combustion chamber 111 with intake and exhaust manifolds 124 and 122. The piston 112 is coupled to a connecting rod 114, which itself is coupled to a crankpin 117 of a crankshaft 116. Fuel is provided to the combustion chamber 111 via a fuel injector 115 and is delivered in proportion to a fuel pulse width (FPW) determined by an electronic engine or vehicle controller 60 (or equivalent microprocessor-based controller) and electronic driver circuit 129. Air charge into the intake manifold 124 is nominally provided via an electronically controlled throttle plate 136 disposed within throttle body 126. Ignition spark is provided to the combustion chamber 111 via spark plug 113 and ignition system 119 in accordance with a spark advance (or retard) signal (SA) from the electronic controller 60.

As shown in FIG. 1, the controller 60 nominally includes a microprocessor or central processing unit (CPU) 66 in communication with computer readable storage devices 68, 70 and 72 via memory management unit (MMU) 64. The MMU 64 communicates data (including executable code instructions) to and from the CPU 66 and among the computer readable storage devices, which for example may include read-only memory (ROM) 68, random-access memory (RAM) 70, keep-alive memory (KAM) 72 and other memory devices required for volatile or non-volatile data storage. The computer readable storage devices may be implemented using any known memory devices such as programmable read-only memory (PROM's), electrically programmable read-only memory (EPROM's), electrically erasable PROM (EEPROM's), flash memory, or any other electrical, magnetic, optical or combination memory devices capable of storing data, including executable code, used by the CPU 66 for controlling the internal combustion engine and/or motor vehicle containing the internal combustion engine. Input/output (I/O) interface 62 is provided for communicating with various sensors, actuators and control circuits, including but not limited to the devices shown in FIG. 1. These devices include an engine speed sensor 150, electronic fuel control driver 129, ignition system 119, manifold absolute pressure sensor (MAP) 128, mass air flow sensor (MAF, "airmeter") 134, throttle position sensor 132, electronic throttle control motor 130, inlet air temperature sensor 138, engine knock sensor 140, and engine coolant temperature 142.

The engine 110 of FIG. 1 also includes and a variable compression ratio ("compression ratio setting") apparatus 170. In a non-limiting embodiment, the variable compression ratio apparatus 170 is operated to vary the effective length of the connecting rod 114, and thus the clearance volume and compression ratio of the engine. Such an apparatus is described, for example, in U.S. application Ser. No. 09/682,263 (Attorney Docket No. 200-1546), entitled "Connecting Rod for a Variable Compression Engine," which is owned by the assignee of the present invention and is hereby incorporated by reference in its entirety. The actual construction and configuration of the variable compression apparatus shown in FIG. 1 is not at all intended to limit the scope of claim protection for the inventions described herein.

In a non-limiting aspect of the present invention, the variable compression ratio apparatus of FIG. 1 is described below as operating in a "high" compression ratio mode (compression ratio of 13:1 and above) or a "low" compression ratio mode (compression ratio of 11:1 and below).

FIGS. 2 through 11 show preferred methods for operating a variable compression ratio internal combustion engine in accordance with the present invention. The methods are not limited in application to a particular engine or type of compression ratio setting apparatus, but are described herein for convenience with reference to the variable compression ratio engine of FIG. 1. The methods described herein can be used advantageously for determining whether a compression ratio setting apparatus of the engine is operating properly. Although the methods can be used alone or in combination with other vehicle and powertrain hardware and software diagnostics, the methods in accordance with the present invention rely on a determination in the change in borderline spark for a change in compression ratio as an independent estimate of the actual compression ratio of the variable compression ratio engine. The methods of the present invention are applicable to both discrete variable compression ratio systems, such as the two-state system described above having discrete "HI" and "LOW" compression ratio states, and continuously variable compression ratio systems having for example "HI" and "LOW" states representing limits on a-continuous range of a compression ratio states.

Figure 2:
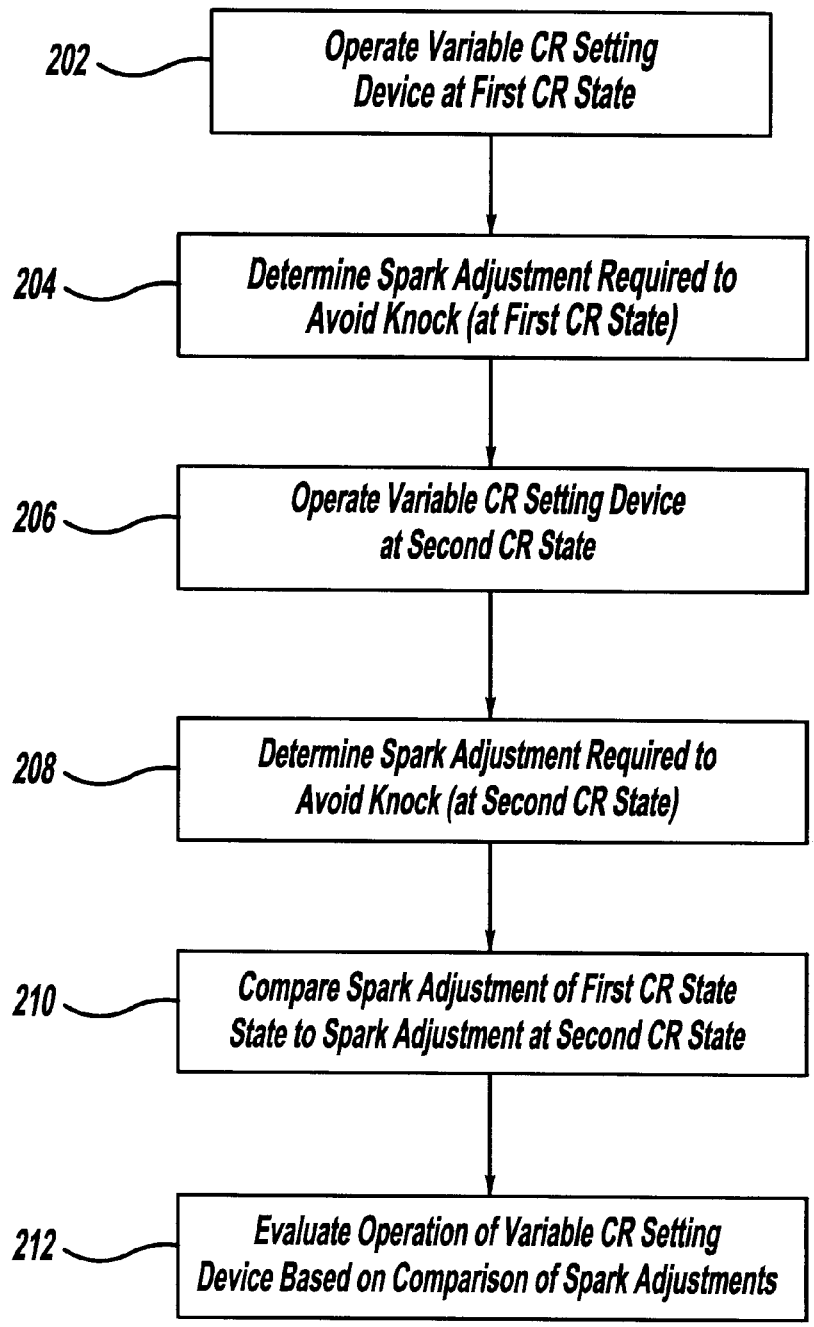
FIG. 2 is a flow diagram of a preferred method for operating a variable compression ratio internal combustion engine in accordance with the present invention.

Referring to FIG. 2, a diagnostic method includes the steps of commanding and operating a variable compression ratio internal combustion engine in a first compression ratio state, step 202, and then determining the amount of spark adjustment required to avoid engine knock at the first compression ratio state, step 204. Engine knock can be detected as shown in FIG. 1 by one or more knock sensor, and regulated using any suitable method. The knock sensor output is used to derive a knock control strategy, which includes deriving a borderline spark angle (spk_bdl) and adjustment thereto (spk_add(i)) required to avoid knock, where "i" is one to the number of engine cylinders (numcyl). The value spk_bdl can be derived using any suitable methods known in the art. The spark adjustment values (spk_add(i)) for one or more of the cylinders can be determined as described below with reference to FIG. 11. The engine is then operated in a second compression ratio state, step 206, and a determination of spark adjustment required to avoid engine knock made at the second compression ratio operating state, step 208. The spark adjustment values, which have been stored in computer memory, are then compared and an evaluation made to determine whether the compression ratio setting apparatus is operating properly, step 210.

Figure 3:
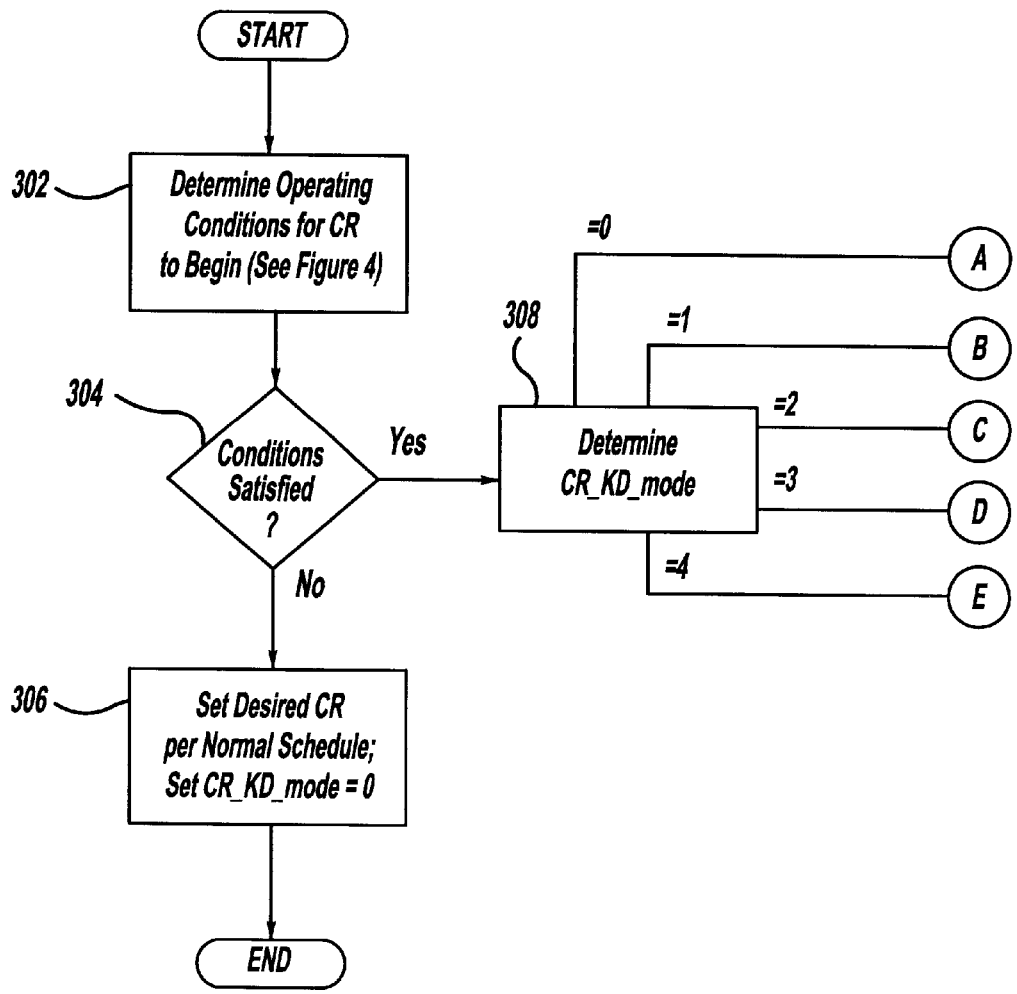
FIG. 3 is a flow diagram of a variable compression ratio diagnostic method in accordance with the present invention.

FIG. 3 shows a flow diagram of a diagnostic routine in accordance with the present invention. The routine is preferably embodied in computer software, which resides in computer memory and is controlled by one or more higher-level software executives or modules of the vehicle and/or engine controller. The compression ratio diagnostic is a so-called "state-machine" having a plurality of states represented by the variable CR_KD_mode stored in RAM. In accordance with a preferred method, CR_KD_mode includes a first state (CR_KD_mode=0) representing normal operation of the engine (excluding execution of the diagnostic routine), a second state (CR_KD_mode=1) requiring determination of a spark adjustment (i.e., "knock adder") required to avoid engine knock with the engine compression ratio set (preset) at "HI", a third state (CR_KD_mode=3) requiring determination of a knock adder at low compression, a fourth state (CR_KD_mode=4) requiring the compression ratio to be reset to the initial setting (e.g., high compression), and a fifth state (CR_KD_mode=5) requiring a comparison of the high compression and low compression knock adders to determine whether a possible error or fault condition exists related to the engine's compression ratio setting apparatus.

Figure 4:
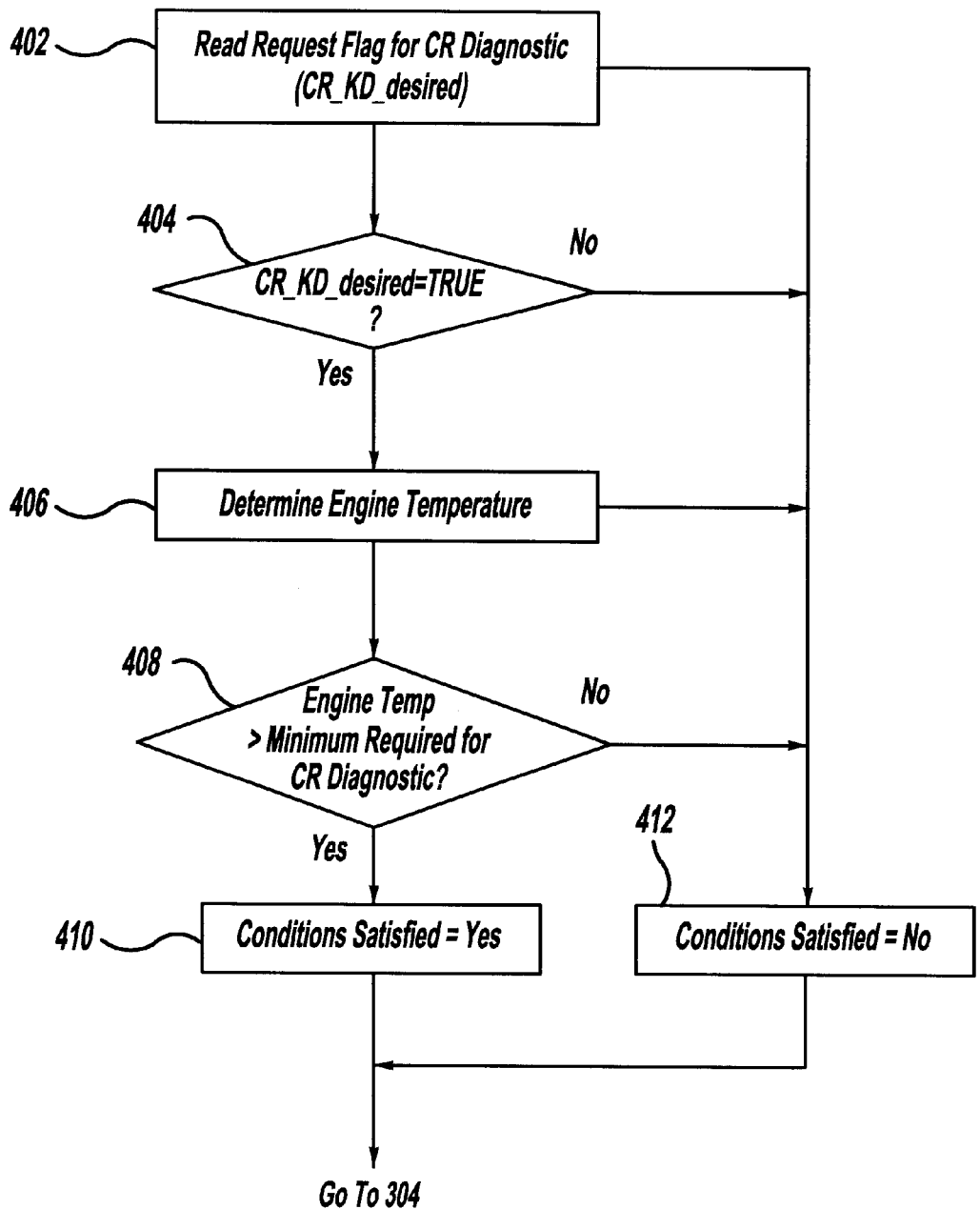
FIG. 4 is a flow diagram of a preferred method for determining whether requisite engine operating conditions exist prior to performing the diagnostic method of FIG. 3.

The diagnostic method shown in FIG. 3 first includes steps to determine whether the requisite engine operating conditions exist, steps 302 and 304. An exemplary check of relevant engine operating conditions is performed as shown in FIG. 4. Note, the steps shown in FIG. 4 are exemplary and nominally involve one or more checks of engine operating conditions or parameters that may effect the operation of the compression ratio setting apparatus and accuracy of the diagnostic test. For example, if the compression ratio setting apparatus relies on oil pressure to configure the engine in one or more of the compression ratio operating modes, then oil temperature may be checked to ensure that the oil is within a prescribed range and thus at a required viscosity. Alternatively, as shown in FIG. 4, engine temperature can be determined and used as a measure of oil temperature.

Referring again to FIG. 4, a compression ratio diagnostic request flag (CR_KD_desired) is interrogated to determine whether an executive module of a corresponding vehicle or engine controller has requested a compression ratio diagnostic, step 402. If CR_KD_desired is set to "TRUE", step 404, then an engine temperature is determined in accordance with step 406. The engine temperature can be sensed or inferred using any known or suitable means. Preferably, an engine coolant temperature (ect) sensor 150 is used as described above with reference to FIG. 1.

The engine coolant temperature ect is then compared to a predetermined minimum engine coolant temperature (CR_KD_MINECT) required to execute the compression ratio diagnostic, step 408. CR_KD_MINECT is stored in computer memory and can be derived empirically using engine test and/or calibration data. If ect exceeds CR_KD_MINECT, then the necessary conditions are satisfied and the method continues with step 308 as shown in FIG. 3. Depending on the state (0–5) of the compression ratio diagnostic mode flag CR_KD_mode, the corresponding steps described below with reference to FIGS. 5 through 10 are performed. Otherwise, if the engine operating conditions are not satisfied in accordance with step 304, then the compression ratio of the engine is set in accordance with a predetermined schedule and CR_KD_mode is set to "0", step 306.

Figure 5:
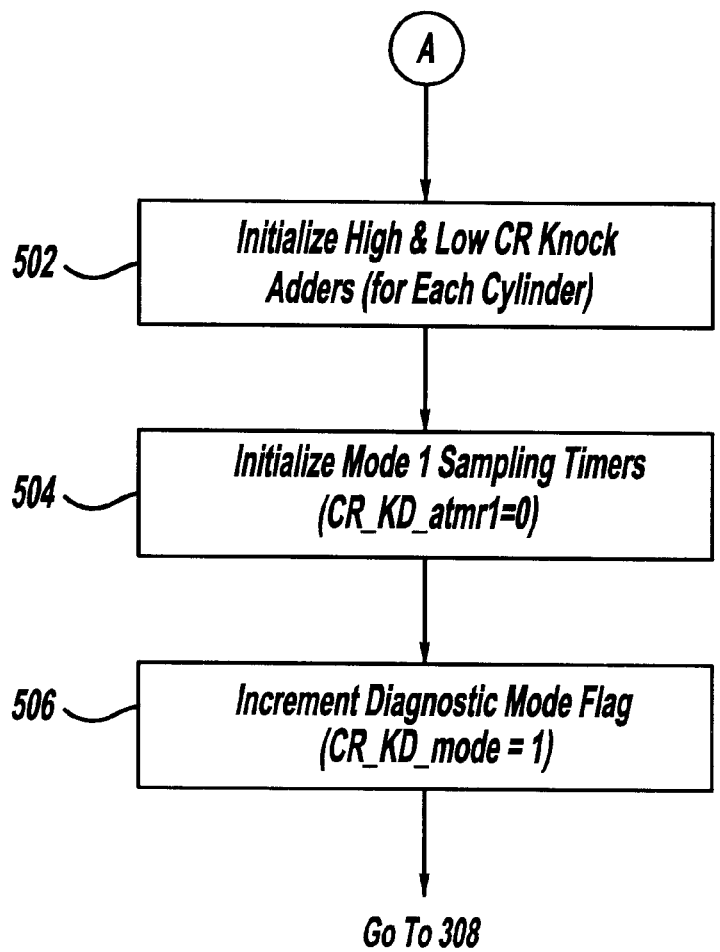
FIG. 5 is a flow diagram corresponding to a first diagnostic state of the method of FIG. 3.

FIG. 5 shows a flow diagram corresponding to a first diagnostic state (CR_KD_mode=0) of the method of FIG. 3. First, average knock adders CR_KD1_knk_add(i) and CR_KD3_knk_add(i) for each of cylinders i=1 to numcyl corresponding to diagnostic modes 1 and 3, respectively, are initialized to zero, step 502. The diagnostic mode flag CR_KD_mode is then set to "1", step 504, to allow the determination of the mode 1 knock adder beginning during a subsequent pass-through of the diagnostic routine. A mode 1 settling timer (CR_KD_atmr1) is then initialized to "0", step 506. The CR_KD_atmr1 allows a predetermined number of samples to be taken of the spark adjustment to ensure reliability. Control of the diagnostic routine is then returned to step 308 of FIG. 3.

Figure 6:
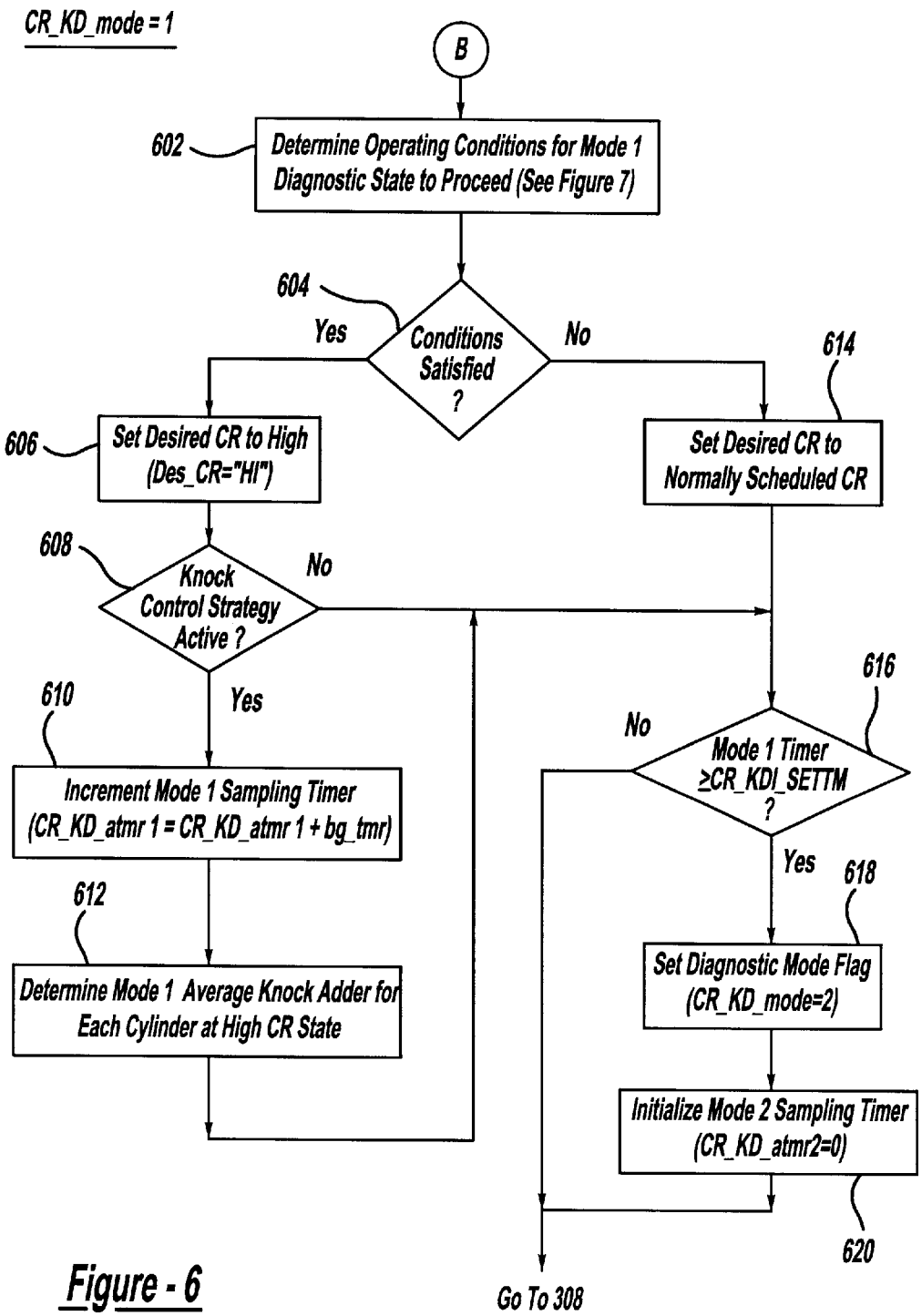
FIG. 6 is a flow diagram corresponding to a second diagnostic state of the method of FIG. 3.
Figure 7:
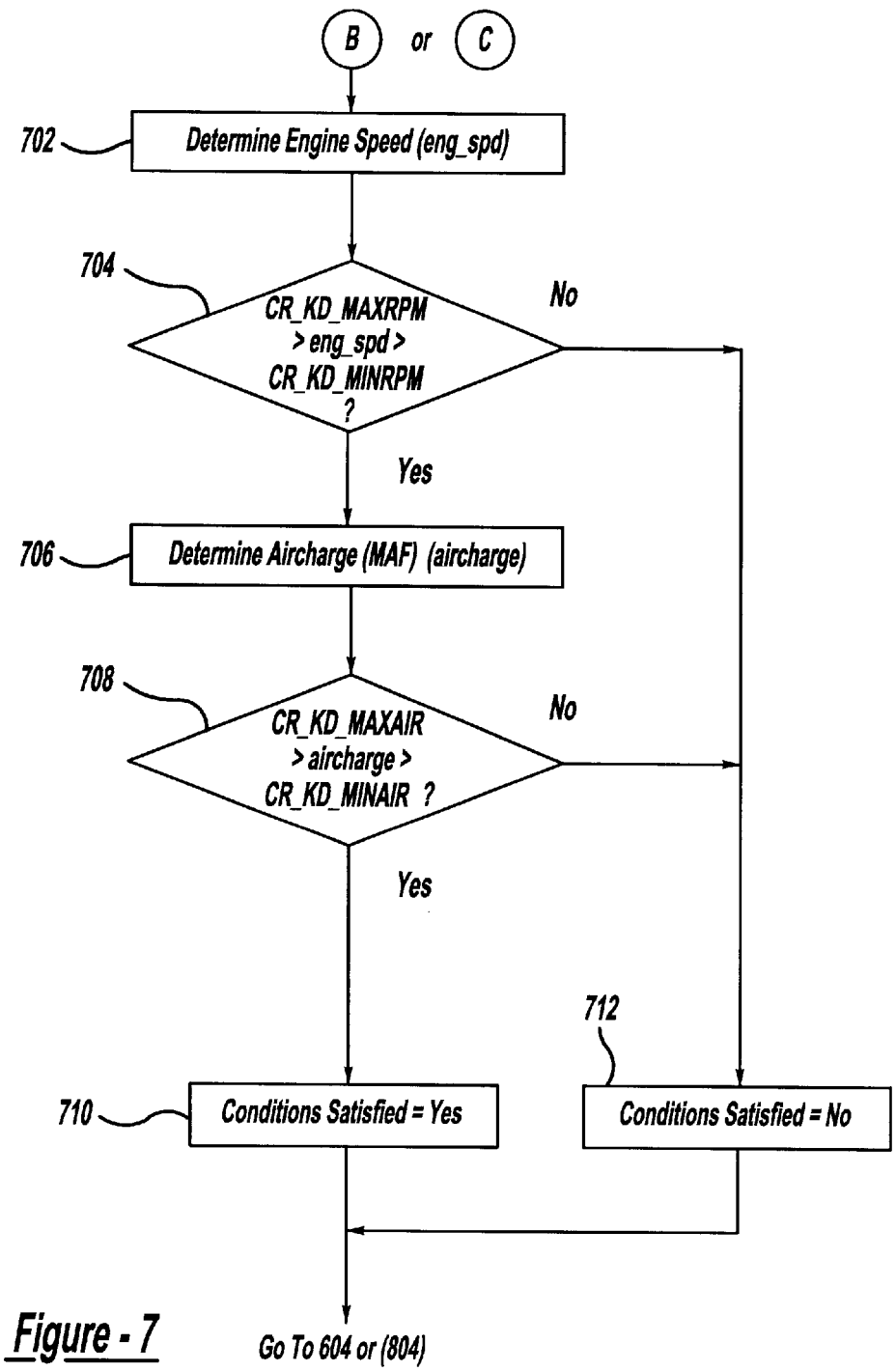
FIG. 7 is a flow diagram of a preferred method for corresponding to block 602 of FIG. 6.

FIG. 6 shows a flow diagram corresponding to a second diagnostic state (CR_KD_mode=1) of the method of FIG. 3. If CR_KD_mode=1 per step 308, then the controller determines whether the operating conditions exist for the mode 1 diagnostic state to continue, steps 602 and 604. Preferably, engine speed (eng_spd) and air charge (aircharge) are verified to be within corresponding predetermined limits before proceeding with the remainder of the mode 1 diagnostic steps. For example, as shown by FIG. 7, eng_spd must lie within the range CR_KD_MINRPM and CR_KD_MAXRPM, and aircharge within the range CR_KD_MINAIR and CR_KD_MAXAIR. CR_KD_MINRPM, CR_KD_MAXRPM, CR_KD_MINAIR and CR_KD_MAXAIR are stored in computer memory and can be derived empirically using engine test and/or calibration data. Eng_spd can be detected as known in the art using sensor 150 as described above with reference to FIG. 1, and air charge measured or inferred as known in the art using MAF sensor 134 and/or MAP sensor 128. If the conditions are satisfied in accordance with steps 704 and 708, then the mode 1 state proceeds with step 606 in FIG. 6.

Referring again to FIG. 6, if the above conditions of FIG. 7 are verified, then the desired compression ratio operating state (Des_CR) is set to high compression, step 606. This is accomplished by commanding the compression ratio setting apparatus to configure the engine in a high compression operating state. If a knock control strategy is active, step 608, then the mode 1 settling timer CR_KD_atmr1 is incremented by a predetermined amount (bg_timer) equal for example to the time elapsed since the previous calculation of CR_KD_atmr1, step 610. See discussion below of FIG. 12 for determining whether a knock control strategy is active. Nominally, bg_timer is equal to 0.01 seconds. The average knock adder for mode 1 (CR_KD1_knk_add(i)) is then determined for each cylinder i=1 to numcyl as a filtered average over a predetermined period of time

CR_KD1_SETTM:

CR_KD1_knk_add(*i*)=(1−CR_KD1_FK)*CR_KD1_knk_add(*i*)(old)+CR_KD 1_FK*spark_add(*i*), where CR_KD1_FK is a filter constant (nominally 0.1), CR_KD1_avg_air(i)(old) is the previous value of CR_KD1_knk_add(i), and where spk_add(i) is the output of the knock strategy at high compression representing the amount of spark subtracted from an open loop calculation of borderline spark (spk_bdl) required to avoid engine knock. CR_KD1_SETTM represents an amount of time required for the filtered average of the cylinder spark adjustment values CR_KD1_knk_add(i) to reach an asymptotic state, and nominally is a calibratable round scalar that can be determined empirically from engine test and/or calibration data. CR_KD_atmr1 is then compared to a predetermined minimum time (CR_KD1_SETTM), step 616. If CR_KD_atmr1 exceeds CR_KD1_SETTM, then steps 618 and 620 are performed to store CR_KD1_knk_add(i) in computer memory, to set the diagnostic mode flag CR_KD_mode to mode "2", and to initialize a mode 2 sampling timer CR_KD_atmr2. Referring to step 616, If the mode 1 timer does not exceed CR_KD1_SETTM, then control is returned to block 308 and the diagnostic continues computing the mode 1 average knock adder so long as the conditions in block 602 and 608 remain satisfied.

Referring again to block 604 of FIG. 6, if the conditions of block 602 are not satisfied, or if the knock control strategy is inactive according to block 608, then computation of the mode 1 average knock adder is bypassed and the engine compression ratio set to a normally scheduled setting, step 614. Steps 616, 618 and 620 are then performed as described above.

Figure 11:
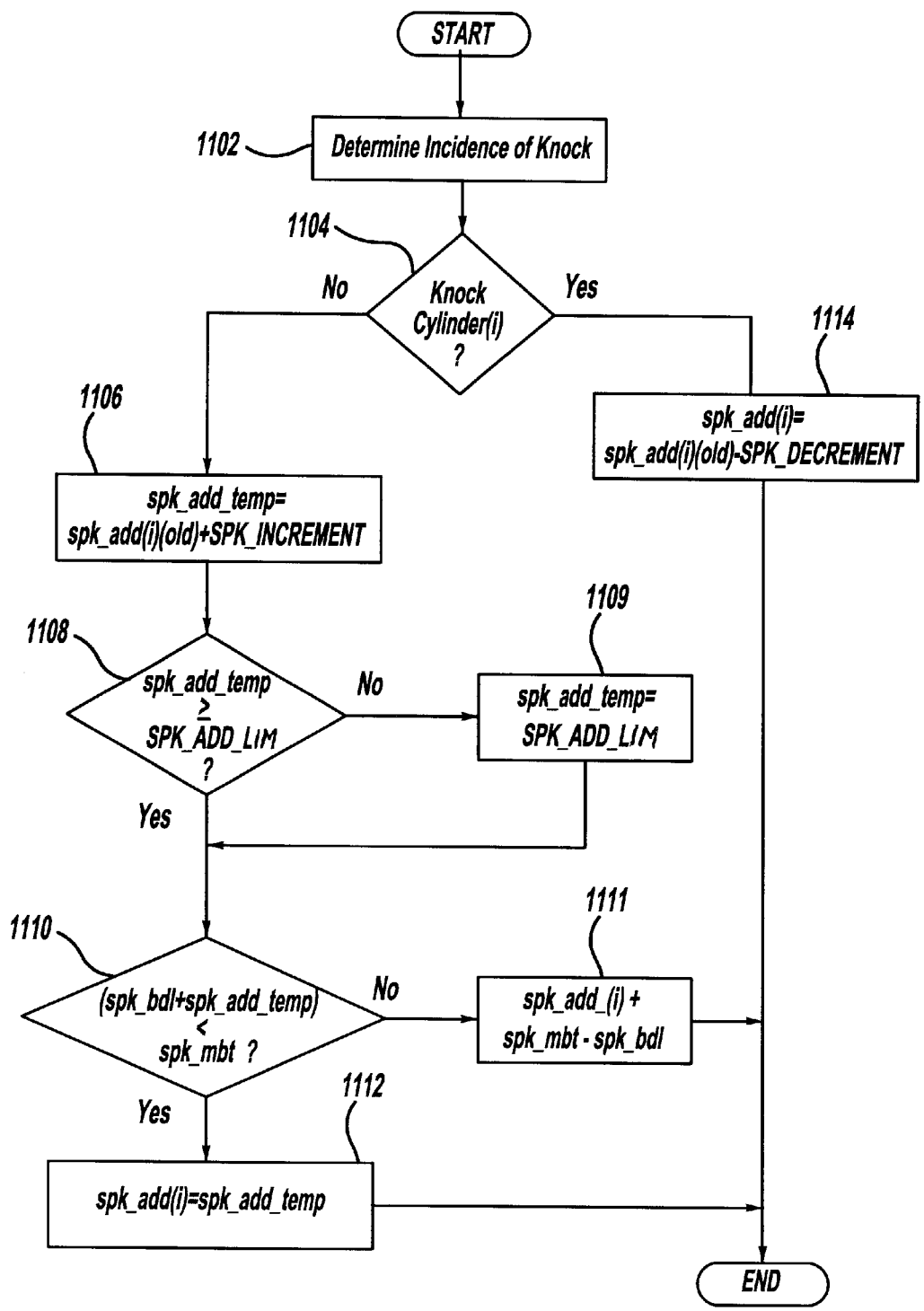
FIG. 11 is a flow diagram corresponding to a method for determining a spark adjustment value in accordance with the present invention.

In accordance with the present invention, the spark "adder" values spk_add(i) at high and low compression ratios can be determined using the steps shown in FIG. 11. First, a knock sensor is used as known in the art to determine the incidence of engine knock for each of the cylinders i=1 to numcyl, step 1102. If engine knock is detected, step 1104, then for each of the cylinders corresponding knock adder values (spk_add(i)) are determined using previous knock adder values (spk_add(i)(old)) and a predetermined spark decrement value (SPK_DECREMENT), step 1114.-SPK_DECREMENT is a calibratable value having a nominal value of approximately 0.5 degrees of spark angle. If no knock is detected, then a temporary knock adder value (spk_add_temp) is set to the previous knock adder value (spk_add(i)(old)) plus a spark increment value (SPK_INCREMENT), step 1106. SPK_INCREMENT likewise is a calibratable value having a nominal value of approximately 0.1 degrees of spark angle. If spk_add_temp is less than or equal to a spark adder limit (SPK_ADD_LIM), nominally 10 degrees of spark angle, and the sum of borderline spark (spk_bdl) and spk_add_temp is less than an estimate (spk_mbt) of spark angle required for maximum best torque, then spk_add(i) equals the value spk_add_temp, steps 1108, 1110 and 1112. The value spk_mbt can be estimated using any suitable methods known in the art. If spk_add_temp exceeds SPK_ADD_LIM, then spk_add_temp is clipped at the SPK_ADD_LIM value, step 1109. If the sum spk_bdl plus spk_add_temp is equal to or greater than spk_mbt, then spk_add(i) is clipped at the value spk_mbt minus spk_bdl, step 1111.

Figure 12:
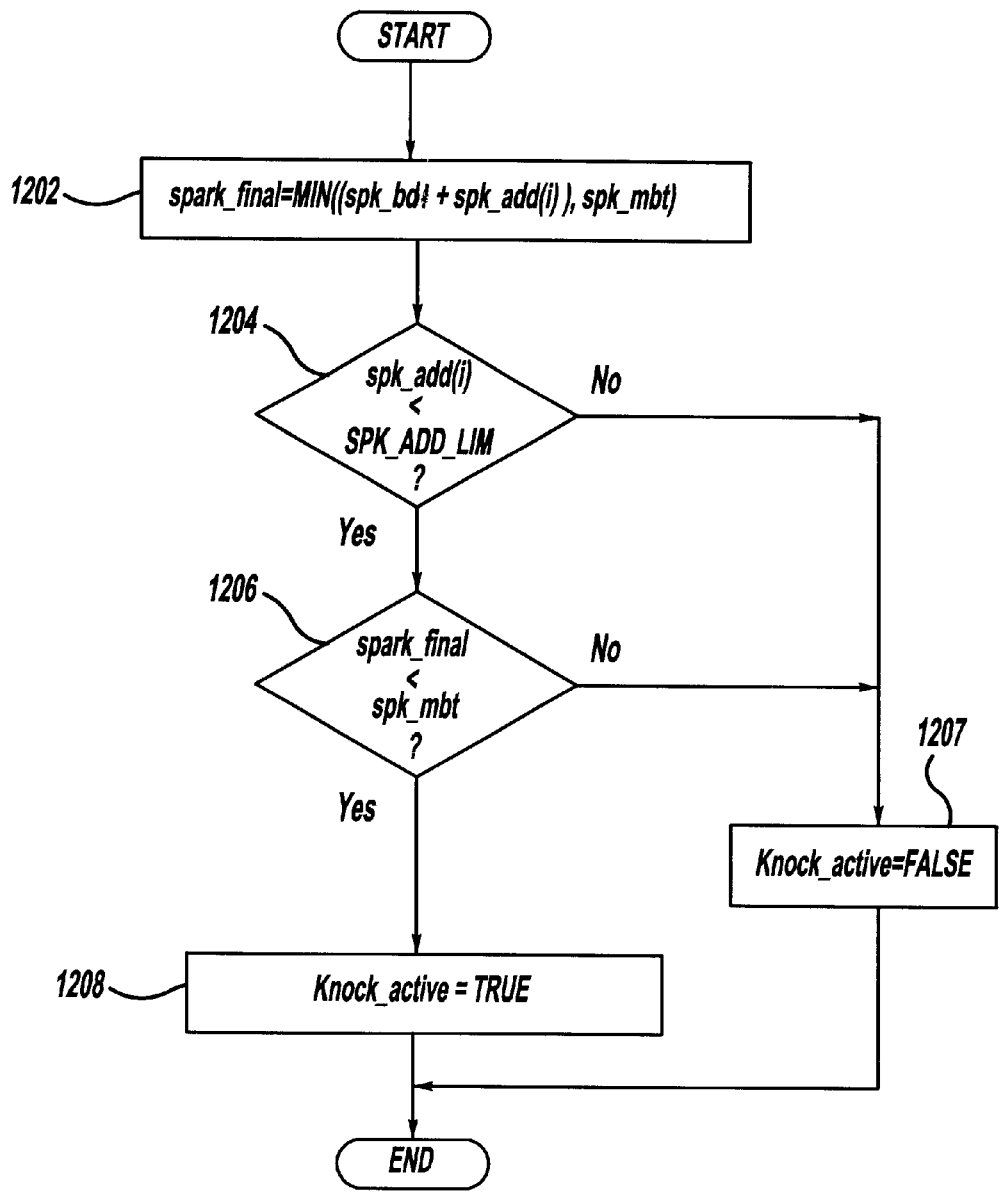
FIG. 12 is a flow diagram corresponding to method for determining whether a knock control strategy is active in accordance with the method of FIGS. 6 and 8.

Referring again to FIG. 6, ignition timing values spk_mbt, spk_bdl and spk_add(i) can in turn be used as shown in FIG. 12 to determine whether a knock control strategy is active in accordance with the step 608. For each cylinder, a final spark value (spark_final) is determined in accordance with step 1202:

spark_final=MIN((spk_bdl+spk_add(*i*)), spk_mbt)

If spk_add(i) is less than SPK_ADD_LIM, and spark_final is less than spk_mbt, then the knock strategy is considered to be active (knock_active=TRUE), step 1208. A single knock_active flag can be set in the event the knock strategy is active for any of the cylinders, or alternatively individual knock_flags can be set for each of the cylinders. Otherwise, the knock_active flag(s) are set to FALSE, step 1207.

Figure 8:
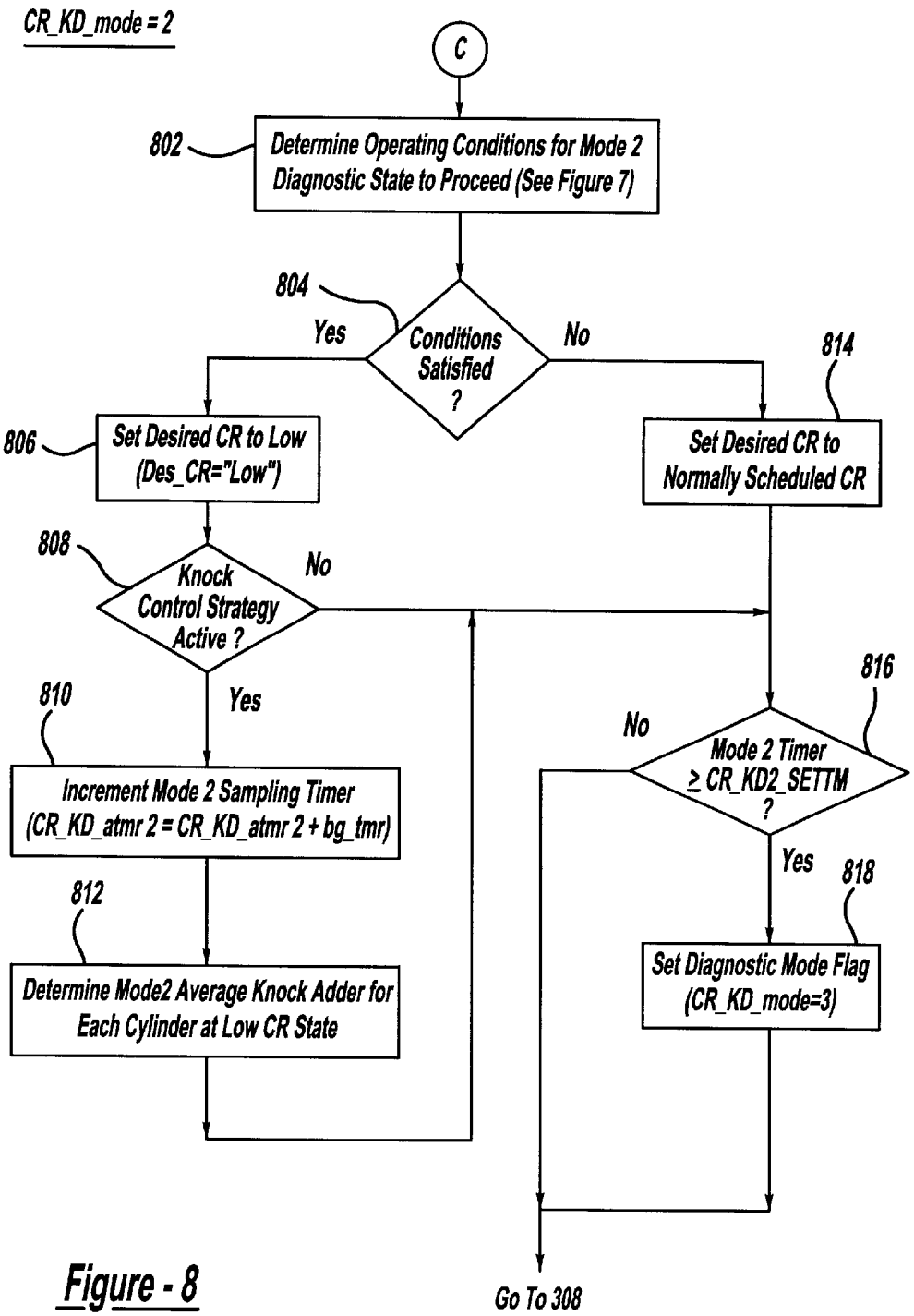
FIG. 8 is a flow diagram corresponding to a third diagnostic state of the method of FIG. 3.

FIG. 8 shows a flow diagram corresponding to a third diagnostic state (CR_KD_mode=2) of the method of FIG. 3. The steps shown in FIG. 8 are similar to the steps of FIG. 6, except that an average knock adder for mode 2 (CR_KD2_knk_add(i)) is computed, step 812. CR_KD2_knk_add(i) is determined for each cylinder i=1 to numcyl as a filtered average over a predetermined period of time CR_KD2_SETTM:

CR_KD2_knk_add(*i*)=(1−CR_KD2_FK)*CR_KD2_knk_add(*i*)(old)+CR_KD 2_FK*spark_add(*i*), where CR_KD2_FK is a filter constant (nominally 0.1), CR_KD2_avg_air(i)(old) is the previous value of CR_KD2_knk_add(i), and where spk_add(i) is the output of the knock strategy at low compression representing the amount of spark subtracted from an open loop calculation of borderline spark (spk_bdl) required to avoid engine knock. CR_KD2_SETTM represents an amount of time required for the filtered average of the cylinder spark adjustment values CR_KD2_knk_add(i) to reach an asymptotic state, and nominally is a calibratable round scalar that can be determined empirically from engine test and/or calibration data. If CR_KD_atmr2 exceeds a minimum settling time CR_KD2_SETTM, then CR_KD2_knk_add(i) is stored in computer memory and he diagnostic mode flag CR_KD_mode is then set to "4", steps 816 and 818.

Figure 9:
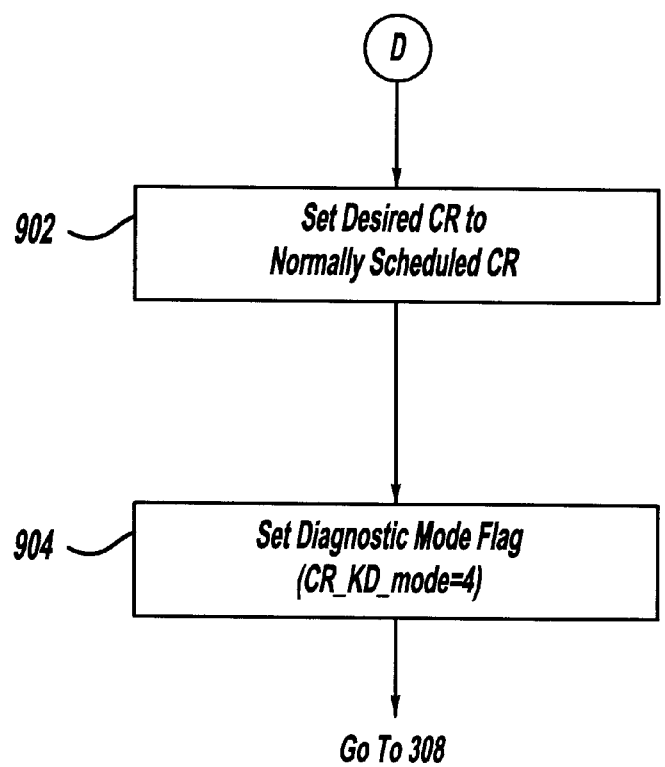
FIG. 9 is a flow diagram corresponding to a fourth diagnostic state of the method of FIG. 3.

Referring again to block 804 of FIG. 8, if the conditions of block 802 are not satisfied, or if the knock control strategy is inactive according to block 808, then computation of the mode 2 average knock adder is bypassed and the engine compression ratio set to a normally scheduled setting, step 814. Steps 816 and 818 are then performed as described above. FIG. 9 shows a flow diagram corresponding to a fourth diagnostic state (CR_KD_mode=3) of the method of FIG. 3. The fourth diagnostic state involves setting the desired compression ratio (Des_CR) back to the initial compression ratio operating state, i.e., high compression, step 902, and setting CR_KD_mode to "4", step 904.

Figure 10:
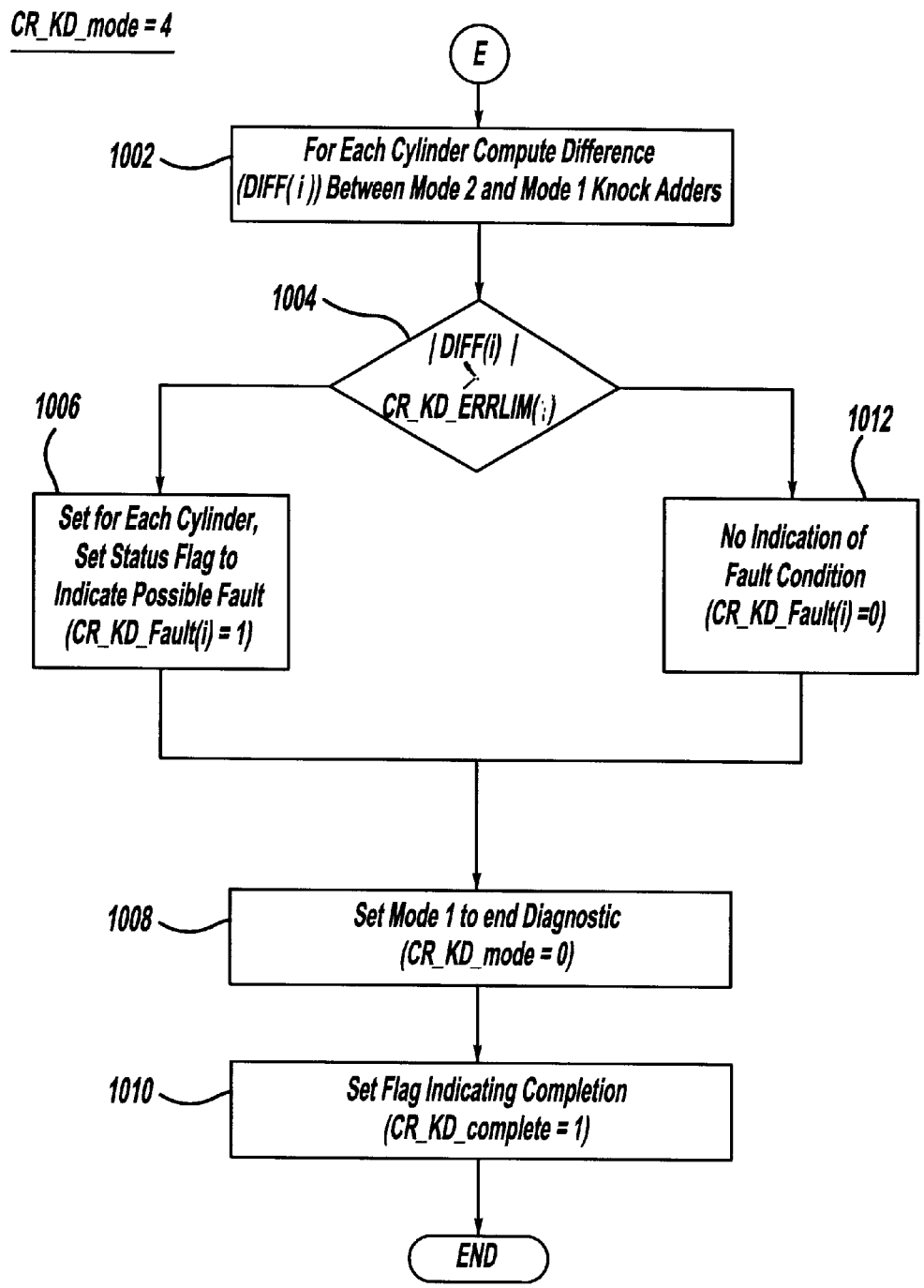
FIG. 10 is a flow diagram corresponding to a fifth diagnostic state of the method of FIG. 3.

FIG. 10 is a flow diagram corresponding to a fifth diagnostic state (CR_KD_mode=4) of the method of FIG. 3. If CR_KD_mode=4, then step 1002 is performed to determine difference values (DIFF(i)) for each cylinder i=1 to numcyl of the mode 2 and mode 1 knock adder values CR_KD2_knk_add(i) and CR_KD1_knk_add(i), respectively. The purpose is to determine a difference in the knock adder values at high versus low compression, i.e., as the compression ratio setting apparatus changes the compression ratio of the engine, an open loop estimation of borderline spark changes accordingly. For a nominally operating compression ratio setting apparatus, the knock adjustments (spk_add(i)) are expected to be small. Thus, if the absolute value of DIFF(i) exceeds a predetermined amount, then it is inferred that the compression ratio setting device may not have operated as intended. This is determined by comparing the absolute value DIFF(i) to a predetermined limits (CR_KD_ERRLIM(i)) stored in computer memory, step 1004. The limits CR_KD_ERRLIM(i)) are determined empirically using engine test data. If the absolute value of DIFF(i) is less than CR_KD_ERRLIM(i), an operational status flag (CR_KD_fault(i)) is set to "1" indicating a possible fault condition associated with the operation of the compression ratio setting apparatus corresponding to cylinder i, step 1006. Otherwise, CR_KD_fault(i) is set to "0" in accordance with step 1012. CR_KD_mode is then set to "0" and a diagnostic status flag (CR_KD_complete) set to "1" upon completion of the diagnostic test, steps 1008 and 1010. The status operational status flag (CR_KD_fault(i)) can be stored in controller memory, or used to generate and store a first code indicating a possible fault condition with a least one cylinder and/or corresponding compression ratio apparatus, and separate codes indicating the operational status of each cylinder and/or corresponding compression ratio apparatus.

If the diagnostic indicates a possible fault condition, appropriate measures may be taken by a vehicle or engine controller to put the engine in a default or "limp home" or mode, or to configure the compression ratio setting apparatus in a one or more selected modes. The compression ratio setting apparatus can be controlled so as to set all or selected cylinders of the internal combustion engine in a default compression ratio operating mode. In addition, a corresponding visible, audible or other diagnostic signal can be generated to inform a vehicle operator of a possible fault condition related to the compression ratio setting apparatus. For example, a diagnostic icon (e.g., OBD-II on-board diagnostic) or other dash-mounted display can be illuminated or activated or a text message displayed instructing the driver to service the vehicle. The signal or again can be specific to a particular cylinder or group of cylinders subject to the compression ratio apparatus. The fault condition may also be verified or confirmed using other engine sensors and diagnostic procedures.

Although the present invention has been described in connection with particular embodiments thereof, it is to be understood that various modifications, alterations and adaptations may be made by those skilled in the art without departing from the spirit and scope of the invention. It is intended that the invention be limited only by the appended claims.

What is claimed:

1. A method for diagnosing operation of an internal combustion engine having a plurality of compression ratio operating states, comprising:
   determining a first spark adjustment value at a first of said compression ratio operating states;
   determining a second spark adjustment value at a second of said compression ratio operating states; and
   evaluating operation of the internal combustion engine based at least in part on the first and second spark adjustment values.

2. The method according to claim 1, wherein said evaluating step comprises:
   determining a difference between the first spark adjustment and the second spark adjustment;
   comparing the difference to a predetermined limit;
   providing an indication of engine operation based on said comparison step.

3. A diagnostic method for an internal combustion engine having a compression ratio setting apparatus, the compression ratio setting apparatus being operable to configure the engine in a plurality of compression ratio operating states, the method comprising:
   determining a first spark adjustment value at a first of the compression ratio operating states;
   determining a second spark adjustment value at a second of the compression ratio operating states;
   comparing the first spark adjustment value to the second spark adjustment value; and
   evaluating operation of the variable compression setting device based at least in part on said comparison step.

4. The method according to claim 3, wherein:
   said step of determining the first spark adjustment value comprises averaging knock adder values while the engine is operated in the first of the compression ratio operating states; and
   said step of determining the second spark adjustment value comprises averaging knock adder values while the engine is operated in the second of the compression ratio operating states.

5. The method according to claim 4, wherein said comparison step comprises:
   determining a difference between the spark adjustment value and the second spark adjustment value; and
   comparing the difference to a predetermined limit.

6. The method according to claim 3, wherein said evaluating step comprises setting an operational status flag relating to the compression ratio setting apparatus.

7. A diagnostic method for a motor vehicle having an internal combustion engine, the internal combustion engine having a compression ratio setting apparatus operable to configure the engine in a high compression operating state and a low compression operating state, the method comprising:
   commanding the compression ratio setting apparatus to operate the engine in the high compression operating state;
   determining an average knock adder value while operating the engine in the high compression ratio operating state;
   commanding the compression ratio setting apparatus to operate the engine in the low compression operating state;
   determining an average knock adder value while operating the engine in the low compression ratio operating state;
   determining a difference between the average knock adder value at the low compression operating state and the average knock adder value at the high compression operating state;
   comparing an absolute value of the difference value to a predetermined limit;
   setting an operational status flag for the compression ratio setting apparatus based on said comparison step.

8. The method according to claim 7, further comprising the step of filtering the average knock adder value at the high compression ratio operating state.

9. The method according to claim 7, further comprising the step of filtering the average knock adder value at the low compression ratio operating state.

10. The method according to claim 7, further comprising the step of providing a vehicle operator an audible signal based on the operational status flag.

11. The method according to claim 7, further comprising the step of providing a visible signal based on the operational status flag.

12. The method according to claim 7, further comprising the step of determining the existence of requisite engine operating conditions prior to said steps of determining the average knock adders at the high and low compression ratio operating states.

13. The method according to claim 12, wherein said step of determining the existence of requisite engine operating conditions comprises:

determining the temperature of said engine; and comparing the engine temperature to a predetermined minimum temperature.

14. The method according to claim 12, wherein said step of determining the existence of requisite engine operating conditions comprises:

determining the rotational speed of the engine; and determining that the engine rotational speed is within a predetermined range.

15. The method according to claim 12, wherein said step of determining the existence of requisite engine operating conditions comprises:

determining the air charge within a cylinder; and determining that the air charge is within a predetermined range.

16. A system for operating an internal combustion engine having a plurality of compression ratio operating states, the system comprising:

at least one sensor disposed within the engine for generating a signal representative of engine knock;

a compression ratio setting apparatus for configuring the engine in selected ones of the compression ratio operating states; and a controller in communication with said sensor and said compression ratio apparatus comprising computer program means for determining a change in spark adjustment required to avoid engine knock as the engine is commanded by said controller to operate the engine in selected ones of the compression ratio operating states, and for evaluating operation of the internal combustion engine based at least in part on the change in the spark adjustment.

17. The system according to claim 16, further comprising a notification device in communication with said controller for providing information relating to the operation of the compression ratio setting apparatus.

18. The system according to claim 16, further means for determining the existence of requisite engine operating conditions.

19. The system according to claim 16, further comprising:

a temperature sensor coupled to the engine and in communication with the controller for detecting an engine coolant temperature of the engine; and computer program means within said controller for comparing the engine coolant temperature to a predetermined minimum temperature.

20. The system according to claim 16, further comprising:

a sensor coupled to the engine and in communication with the controller for detecting a rotational speed of the engine; and computer program means within said controller for determining whether the engine rotational speed is within a predetermined range.

21. The system according to claim 16, further comprising:

a sensor coupled to the engine and in communication with the controller for detecting an air charge of the engine; and computer program means within said controller for determining whether the air charge is within a predetermined range.

22. An article of manufacture for operating an internal combustion engine having a plurality of compression ratio operating states, the article of manufacture comprising:

a computer usable medium; and a computer readable program code embodied in the computer usable medium for directing a computer to control the steps of determining a change in spark adjustment required to avoid engine knock as the engine is commanded by said controller to operate the engine in selected ones of the compression ratio operating states, and evaluating operation of the internal combustion engine based at least in part on the change in the spark adjustment.

* * * * *